US006211862B1

(12) United States Patent
Park et al.

(10) Patent No.: US 6,211,862 B1
(45) Date of Patent: *Apr. 3, 2001

(54) WIRE/WIRELESS KEYBOARD FOR USE IN A COMPUTER SYSTEM AND A METHOD OF OPERATING THE SAME

(75) Inventors: Hee-Duck Park, Suwon; Surg-June Lee, Seoul, both of (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,003

(22) Filed: Mar. 13, 1998

(30) Foreign Application Priority Data

Mar. 15, 1997 (KR) ...................................... 97-8836

(51) Int. Cl.[7] ........................................ G09G 5/00
(52) U.S. Cl. ............................ 345/169; 345/168
(58) Field of Search .................... 345/168, 169, 345/156, 158, 157, 2, 173, 170, 171; 341/22

(56) References Cited

U.S. PATENT DOCUMENTS

| 4,775,928 | 10/1988 | Kendall et al. ................. 364/200 |
|---|---|---|
| 5,081,628 | 1/1992 | Maekawa et al. ................ 371/34 |
| 5,109,228 | * 4/1992 | Banaszak ........................ 341/175 |
| 5,189,543 | * 2/1993 | Lin et al. ........................ 359/142 |
| 5,247,285 | 9/1993 | Yokota et al. .................. 345/169 |
| 5,267,181 | 11/1993 | George ......................... 364/709.12 |
| 5,307,297 | * 4/1994 | Iguchi et al. ................. 364/708.1 |
| 5,410,305 | * 4/1995 | Barrus et al. ................. 341/22 |
| 5,440,502 | * 8/1995 | Register ........................ 364/708.1 |
| 5,515,051 | * 5/1996 | Tanaka et al. .................. 341/174 |
| 5,615,393 | 3/1997 | Kikinis et al. ................. 395/887 |
| 5,644,338 | 7/1997 | Bowen .......................... 345/168 |
| 5,675,390 | * 10/1997 | Schindler ...................... 345/27 |
| 5,708,458 | * 1/1998 | Vrbanac ........................ 345/156 |
| 5,793,359 | * 8/1998 | Ushikubo ...................... 345/169 |
| 5,861,822 | * 1/1999 | Park et al. .................... 341/22 |
| 5,877,745 | * 3/1999 | Beeteson et al. .............. 345/156 |
| 5,949,643 | * 9/1999 | Batio .......................... 361/681 |

\* cited by examiner

*Primary Examiner*—Xiao Wu
(74) *Attorney, Agent, or Firm*—Robert E. Bushnell, Esq.

(57) ABSTRACT

An advanced wire/wireless keyboard for use in a computer system, which comprises a user ID (identification) setting function. When the keyboard operates with wireless communication, the keyboard controller allows delivery of the user ID information, to which an keyboard data signal is added, to the computer main unit 10. With this keyboard, the noise generation is prevented by generating a specific wireless signal corresponding to the user ID information. The keyboard has a rechargeable battery and a battery charging circuit for charging the rechargeable battery during wire communication for subsequent use during wireless communication.

16 Claims, 9 Drawing Sheets

WIRE/WIRELESS KEYBOARD FOR USE IN A COMPUTER SYSTEM AND A METHOD OF OPERATING THE SAME

CLAIM FOR PRIORITY

This application makes reference to, incorporates the same herein, and claims all benefits accruing under 35 U.S.C. §119 from an application for A WIRE/WIRELESS KEYBOARD FOR USE IN A COMPUTER SYSTEM AND A METHOD OF OPERATING THE SAME earlier filed in the Korean Industrial Property Office on Mar. 15, 1997, and there duly assigned Serial No. 8836/1997, a copy of which application is annexed hereto.

BACKGROUND OF THE INVENTION

1. Technical Field

The present invention relates to computer systems such as office computers, personal computers, and data processors including a wire/wireless keyboard, and more particularly, relates to a wire/wireless keyboard for use in a computer system and a method of operating the same.

2. Related Art

A typical computer system comprises a display unit, input devices such as a keyboard, a central processing unit (CPU) and data storage devices (e.g., floppy or hard disk drive) in a separate enclosure. This architecture is commonly used in "desk-top" personal computer systems, work stations, terminals and the like. The display unit, the keyboard and the main body containing all the essential circuitry of the computer may be integrated in a single, deployable portable housing structure, typically referred to as "lap-top" computers. Keyboard is typically connected to the main body through a connector cable to control operation of the computer. The cable which connects the keyboard to the main body of the computer is very stable and reliable for data transmission. However, the cable can be cumbersome, unattractive, and more importantly, cannot be moved freely because its length is standardized. If the connector cable is lengthened more than the standardized length, noise is often generated during data transmission.

Advanced wireless keyboard has been developed to provide a viable substitute for traditional keyboard for data transmission between the keyboard and the central processing unit of the computer without using cable. Examples of wireless keyboards can be found, for example, in U.S. Pat. No. 4,775,928 for Hand-Held Wireless Computer Controller System issued to Kendall et al., U.S. Pat. No. 5,081,628 for Cordless Keyboard issued to Maekawa et al., U.S. Pat. No. 5,247,285 for Standup Portable Personal Computer With Detachable Wireless Keyboard And Adjustable Display issued to Yokota et al., U.S. Pat. No. 5,644,338 for Ergonomic Laptop Computer And Ergonomic Keyboard issued to Bowen, and U.S. Pat. No. 5,615,393 for Computer System Having A Cordless Keyboard And An Induction Coil In A Plug-In Electronic Card Module issued to Kikinis et al.

Wireless keyboard transmits data to the central processing unit (CPU) of the computer via either radio frequency (RF) signals or infrared (IR) signals. While contemporary designs of wireless keyboards are becoming acceptable substitutes for cable keyboards, I have observed that there are still problems associated with wireless transmission. The first problem is noise that may be generated during wire communication because of other wireless devices in the proximity of the computer system. The second problem is limited use of battery power for the wireless keyboard. The wireless keyboard must be designed to operate for extended period of time.

SUMMARY OF THE INVENTION

Accordingly, it is therefore an object of the present invention to provide an advanced keyboard for a computer system with high reliability and improved operability.

It is also an object to provide a versatile keyboard for a computer system with both wire and wireless communication capability and eithout noise interference.

It is another object to provide an advanced keyboard having a rechargeable battery that is chargeable during wire communication with a computer system for subsequent use during wireless communication.

It is further an object to provide an advanced keyboard for a computer system that is configured with an identification setting function to avoid noise interference from other wireless devices in the proximity of the computer system during wireless communication.

These and other objects of the present invention can be achieved by a computer system which comprises an advanced keyboard for wire and wireless communications; and a computer main unit comprising at least a main system and a power supply source for receiving data information from the keyboard via one of said wire and wireless communications; and a connector cable for connecting the keyboard to the computer main unit, when the keyboard and the computer main unit operate with wireless communications; wherein the keyboard comprises at least a rechargeable battery, a wireless transceiver for transforming data information into wireless signals for wireless transmission to the computer main unit, and a controller for controlling data information from the keyboard to be transmitted by the wireless transceiver to the computer main unit during wireless communications and transmitted through the connector cable during wire communications, and wherein the rechargeable battery is charged with a power voltage supplied from the power supply source of the computer main unit during wire communications.

According to another aspect of the present invention, a method of operating a computer system using an advanced wire/wireless keyboard comprises the steps of determining whether the keyboard is connected to the computer main unit through a connector cable; when the keyboard is connected to the computer main unit, key input data is transmitted through the connector cable to the computer main unit; and when the keyboard is not connected to the computer main unit, wireless signals corresponding to the key input data are transmitted to the computer main unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
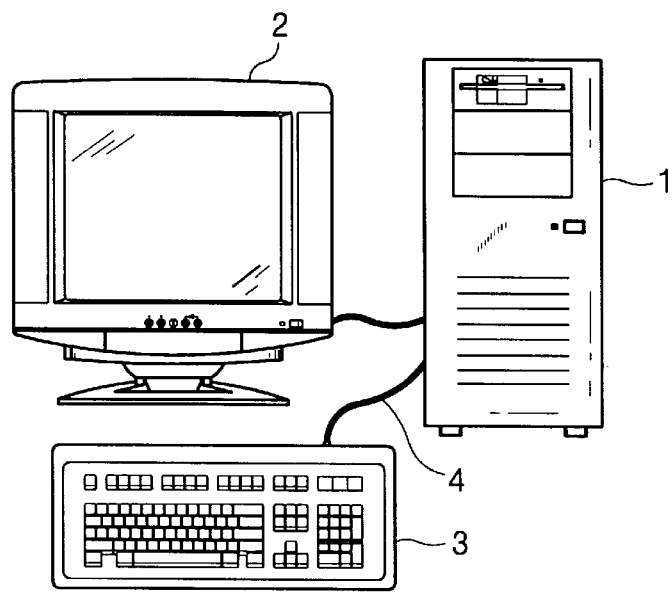
FIG. 1 illustrates a computer system using a typical wire keyboard for operation.

Referring now to the drawings and particularly to FIG. 1, which illustrates a typical computer system using a commonly available keyboard with cable. As shown in FIG. 1, the computer system includes a computer main unit 1, a display unit (i.e., monitor) 2 and a wire keyboard 3. The wire keyboard 3 is connected with the computer main unit 1 through a connector cable 4. The wire keyboard 3 is very stable for data transmission, but cannot be moved freely because the length of the connector cable 4 is standardized. If the connector cable 4 is lengthened more than the standardized length, this causes noise to be introduced in the cable.

Figure 2:
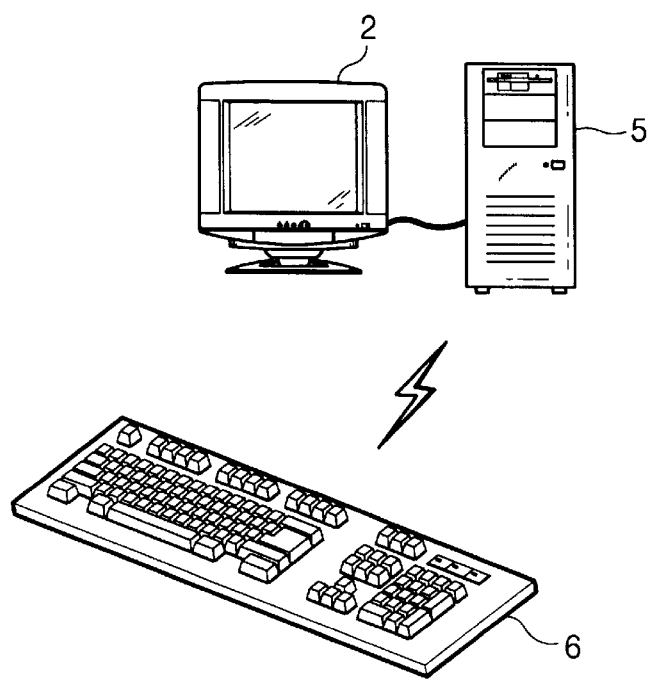
FIG. 2 illustrates a computer system using a typical wireless keyboard for operation.

In order to solve the problems which may be caused in use of the wire keyboard, as shown in FIG. 2, wireless keyboard 6 has been developed which is capable of data transmission to the computer main unit 5 via wireless communication, wherein computer 2 is connected to computer main unit 5. Typically, the wireless keyboard 6 transmits (control) data wirelessly to the computer main unit 5 using RF (Radio Frequency) or IR (Infrared Rays) as wireless signals. While the wireless keyboard has become an acceptable substitute for wire keyboards as I have noted, there are still problems associated with wireless transmission. The first problem is noise that is still generated during wire communication. The second problem is limited use of battery power for the wireless keyboard. The wireless keyboard must be designed to operate for extended period of time.

Turning now to a novel and advanced wire/wireless keyboard for a computer system with high reliability and improved operability and having wire and wireless communication capability. The advanced keyboard is provided with a rechargeable battery that is chargeable during wire communication with a computer system for subsequent use during wireless communication. That is, during wire communication with the computer system, the rechargeable battery is charged so that, when the keyboard is disconnected from the computer system, the fully charged battery of the keyboard provides battery power insurance for an extended time period. In addition, the wire/wireless keyboard is configured with an identification setting function to avoid noise interference during wire and wireless communication.

Embodiment 1

Figure 3:
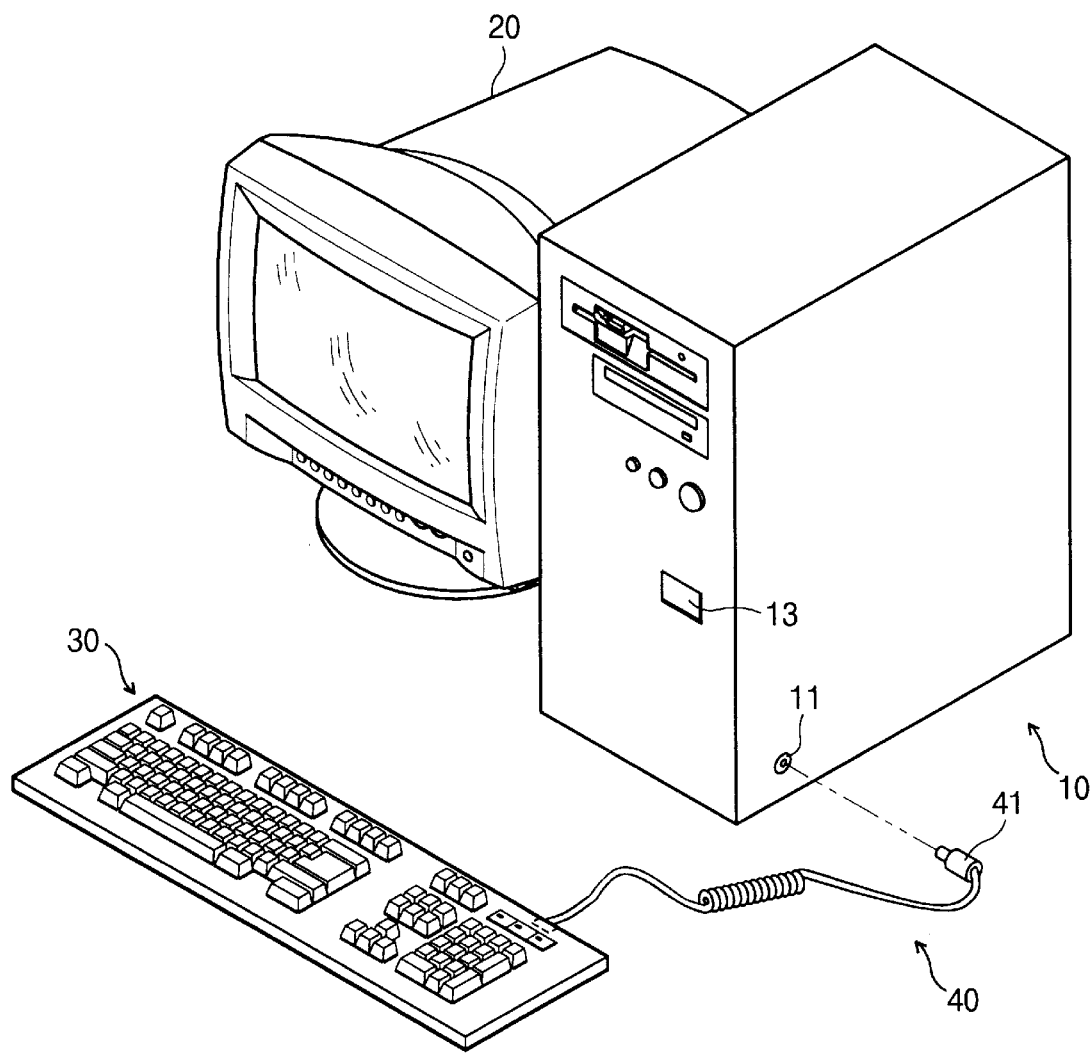
FIG. 3 illustrates a computer system using an advanced wire/wireless keyboard constructed according to a preferred embodiment of the present invention.

FIG. 3 illustrates a computer system using an advanced wire/wireless keyboard according to an example of the present invention. As shown in FIG. 3, the computer system also includes a computer main unit 10, a display unit 20, and an advanced keyboard 30 which operates in both wire and wireless communication modes. The computer main unit 10 is equipped with a wireless transceiver 13 which receives data input from the advanced keyboard 30 when the keyboard 30 operates in a wireless communication mode, that is, without a connector cable 40. The connector cable 40 is basically connected to the wire/wireless keyboard 30 for wire communication, and is separable from the keyboard 30 and the computer main unit 10 for wireless communication.

Figure 4:
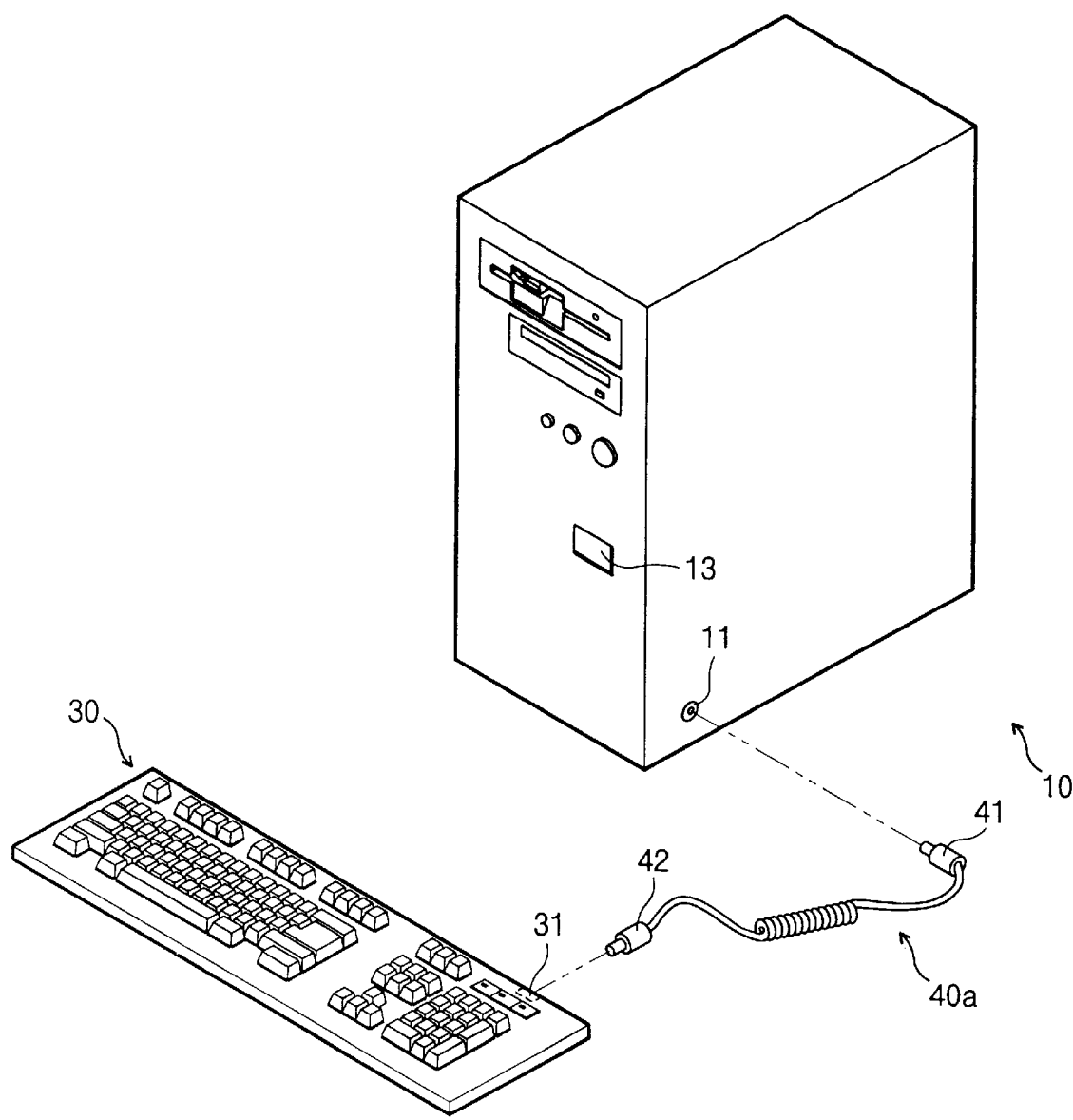
FIG. 4 illustrates a connector cable is separable from the wire/wireless keyboard and the computer main unit.
Figure 5A:
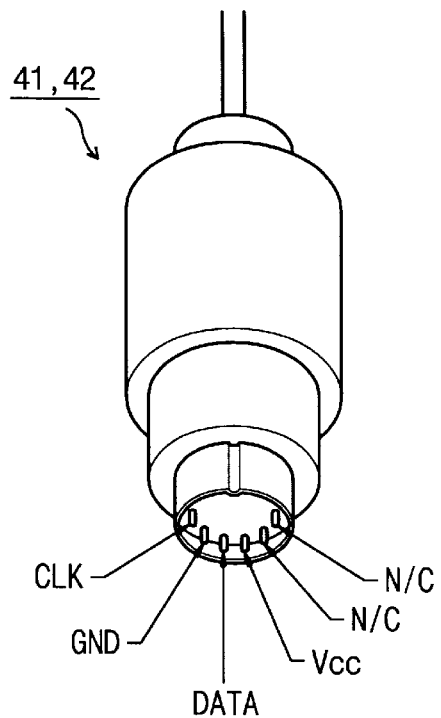
FIGS. 5A and 5B are perspective views of a PS/2 type keyboard connector which is adapted to the wire/wireless keyboard as shown in FIG. 3.
Figure 5B:
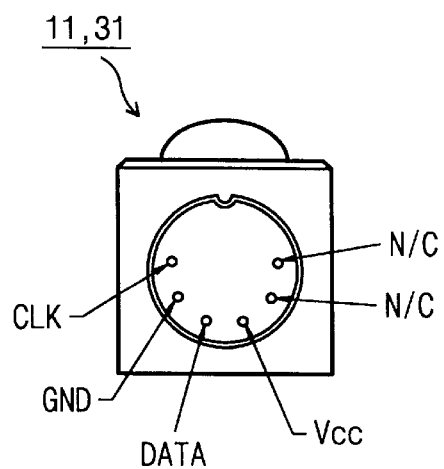

The connector cable 40a is connected between the keyboard 30 and the computer main unit 10 when the keyboard 30 operates in a wire communication mode, as shown in FIG. 4. During wire communication, a rechargeable battery located in the keyboard 30 is automatically charged by a power voltage which is supplied from the computer main unit 10. The connector cable 40a has DIN plugs 41 and 42 which are located at both ends thereof. The computer main unit 10 and the keyboard 30 comprise DIN jacks 11 and 31 which are suitable for the DIN plugs 41 and 42, respectively. The DIN plug and jack are of either PC/AT type or PS/2 type which are widely used for computer applications. In this embodiment, a 6-pin connector of PS/2 type is used as the keyboard connector cable as shown in FIGS. 5A–5B. When the connector cable 40a is connected to the computer main unit 10, the keyboard 30 operates with a power voltage supplied from the computer main unit 10. The power voltage from the computer main unit 10 is also used to charge the rechargeable battery of the keyboard 30. The connector cable 40a has a male connector 41, 42 as shown in FIG. 5A for connection with the computer main body 10, and a female connector 11, 31 as shown in FIG. 5B for connection with the keyboard 30. The male connector 41, 42 is comprised of a shell for chassis ground and at least six pins, a keyboard clock pin (CLK) is used for keyboard clock, a ground pin (GND) is used for signal ground, a data pin (DATA) is used for keyboard data, a voltage supply pin (Vcc) is used for voltage supply, and reserve pins (N/C) for no connection. The female connector 11, 31 is comprised of the same pin numbers, the keyboard clock pin (CLK), the ground pin (GND), the data pin (DATA), the voltage supply pin (Vcc), and the reserve pins (N/C).

When the keyboard operates in a wireless communication mode, the connector cable 40a is separated from the keyboard 30 and the computer main unit 10. If the keyboard 30 is electrically separated from the computer main unit 10, the rechargeable battery located in the keyboard 30 provides a battery voltage charged during the wire communication for an extended time period.

Figure 6:
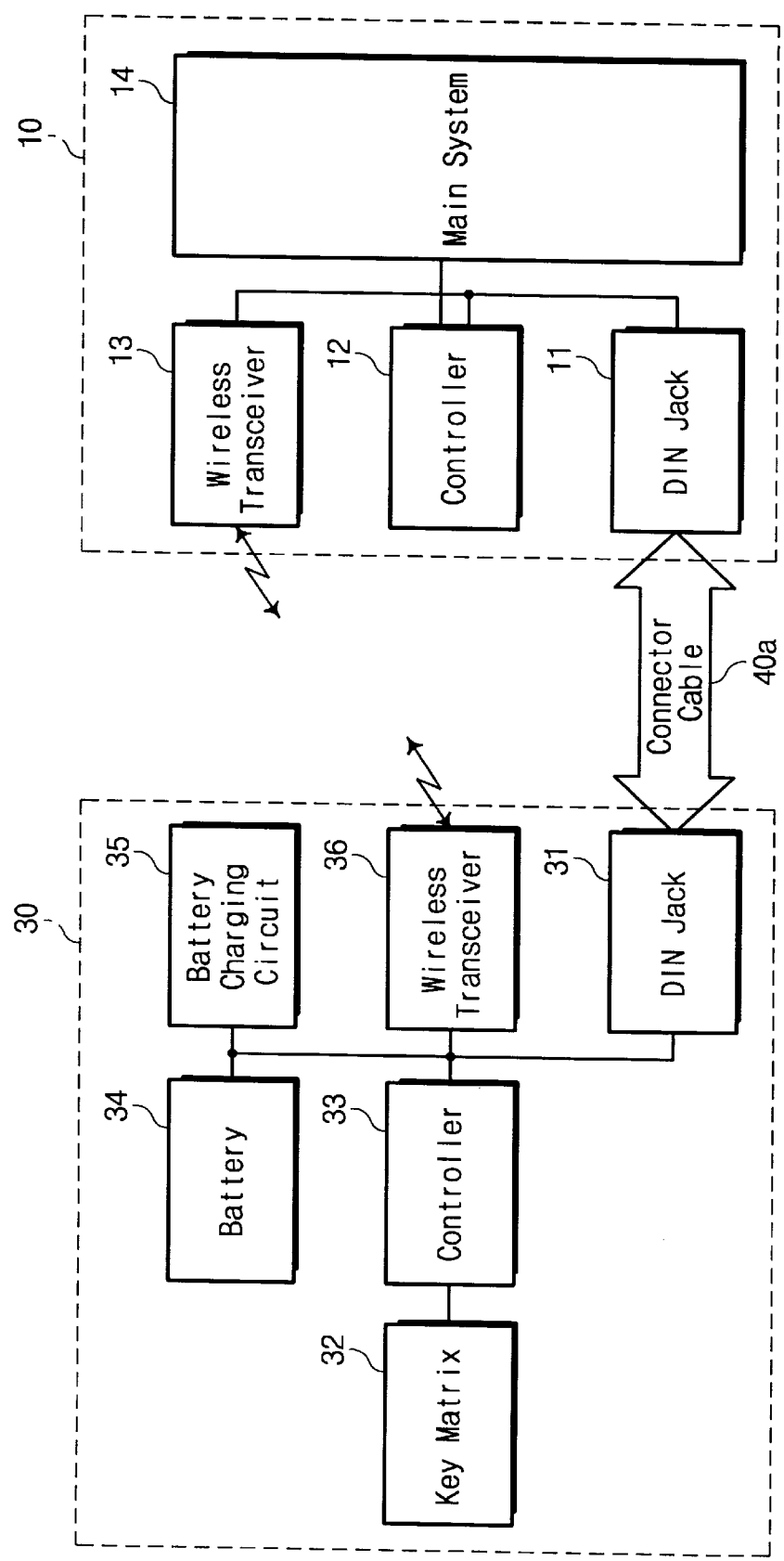
FIG. 6 is a block diagram of a combination circuit of the wire/wireless keyboard and the computer main unit.

FIG. 6 is a circuit diagram of the wire/wireless keyboard 30 and the computer main unit 10 connected by the connector cable 40a. As shown in FIG. 6, the keyboard 30 has a keyboard communication port 31 (e.g., a DIN jack), a key matrix 32 with a plurality of keys (not shown), a controller 33 for controlling overall operation of the keyboard 30, a wireless transceiver 36 for wireless communication with the computer main body 10, a rechargeable battery 34 and a battery charging circuit 35. Although not shown, the keyboard 30 is also provided with an indicator for indicating an operation state of the keyboard. Likewise, the computer main unit 10 has a communication port 11 having a DIN jack, a controller 12 for controlling data communication with the keyboard 30, a wireless transceiver 13 for wireless communication with the keyboard 30.

Figure 7:
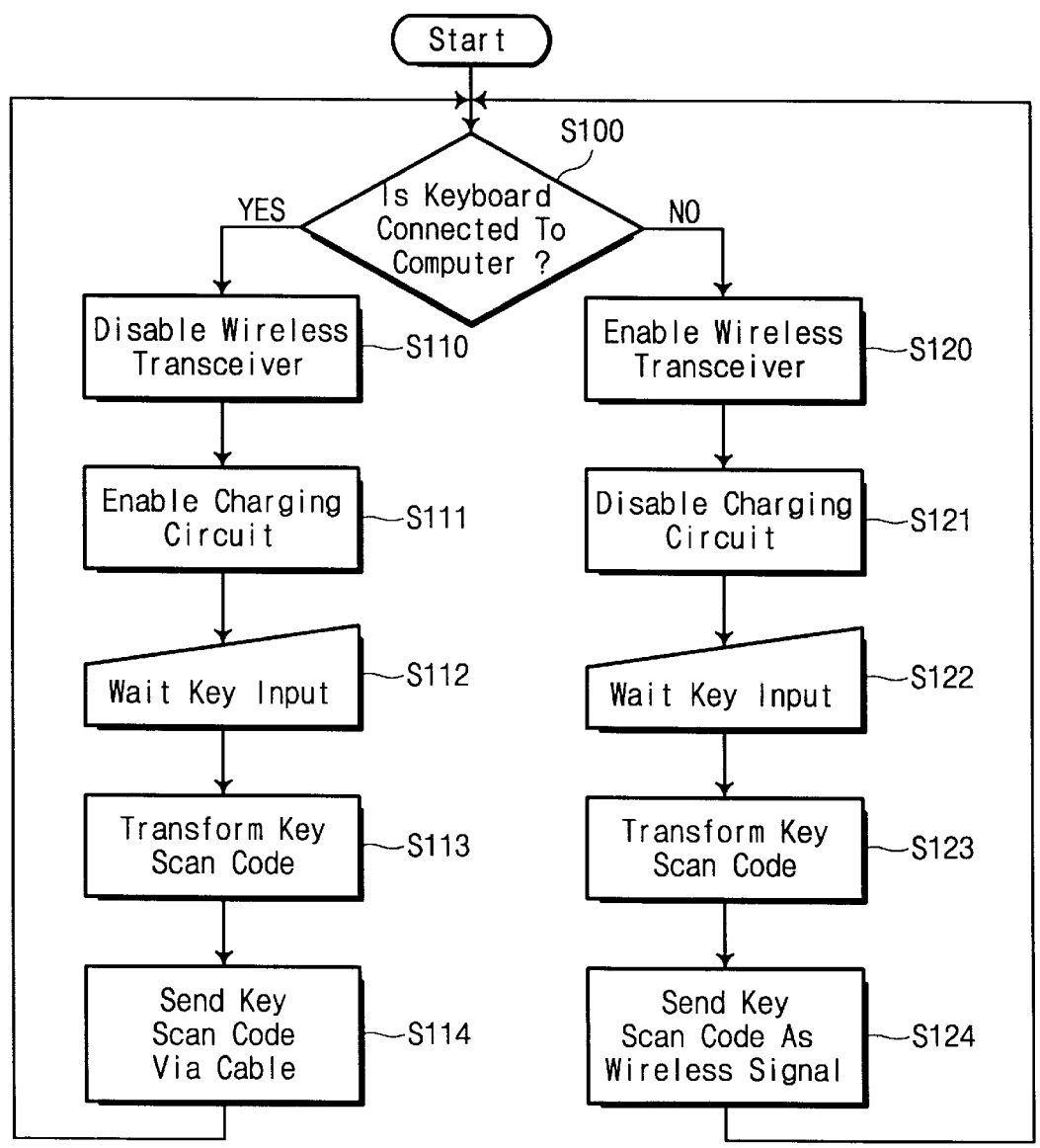
FIG. 7 is a flow chart of an operation of the wire/wireless keyboard as shown in FIG. 3.

Now, the operation of the keyboard 30 and the computer main unit 10 in FIG. 6 will be described in detail with reference to FIGS. 7 and 8 hereinbelow. First, it should be noted that the control operation of the keyboard 30 is preformed by the controller 33, and likewise, the control operation of the computer main unit 10 is performed by the controller 12.

At step S 100, the controller 33 of the keyboard 30 determines whether or not the keyboard 30 is connected to the computer main unit 10 through the connector cable 40a. This determination step can be accomplished by two methods. The first method is to detect a power supply state of a power supply line (e.g., a power source pin of the DIN jack 31), and the second method is to detect a data input state of a data line (e.g., a data pin of a DIN jack 31).

If the keyboard 30 is connected to the computer main unit 10 through the connector cable 40a at step S100, the controller 33 proceeds to step S110 to disable operation of the wireless transceiver 36 and at the same time initiate operation of the keyboard 30 in a wire communication mode. At step S111, the battery charging circuit 35 is enabled so that the rechargeable battery 34 is charged with a power voltage from the computer main unit 10. At step S112, the controller 33 waits for a key input and the control proceeds to step S113, wherein key input data is transformed into a key scan code. At step S114, the transformed key scan code is transmitted through the connector cable 40a to the computer main unit 10, and the control returns to step S100.

If the keyboard 30 is not connected to the computer main unit 10 through the connector cable 40a at step S100, the controller 33 of the keyboard 30 proceeds to step S120. At step S120, the operation of the wireless transceiver 36 is enabled and at the same time the keyboard 30 starts to operate with wireless communication. At step S121, the battery charging circuit 35 is disabled so that the rechargeable battery 34 is not charged by the battery charging circuit 35, and the control proceeds to step S122. At step S122, the controller 33 waits for a key input. If a key is pressed, the control proceeds to step S123 wherein key input data is transformed into a key scan code. At step S124, the transformed key scan code is converted into a wireless signal by the wireless transceiver 36 and transmitted to the computer main unit 10, and the control proceeds to step S100. The wireless signal may be either RF (Radio Frequency) signal or IR (Infrared Rays) signal.

Figure 8:
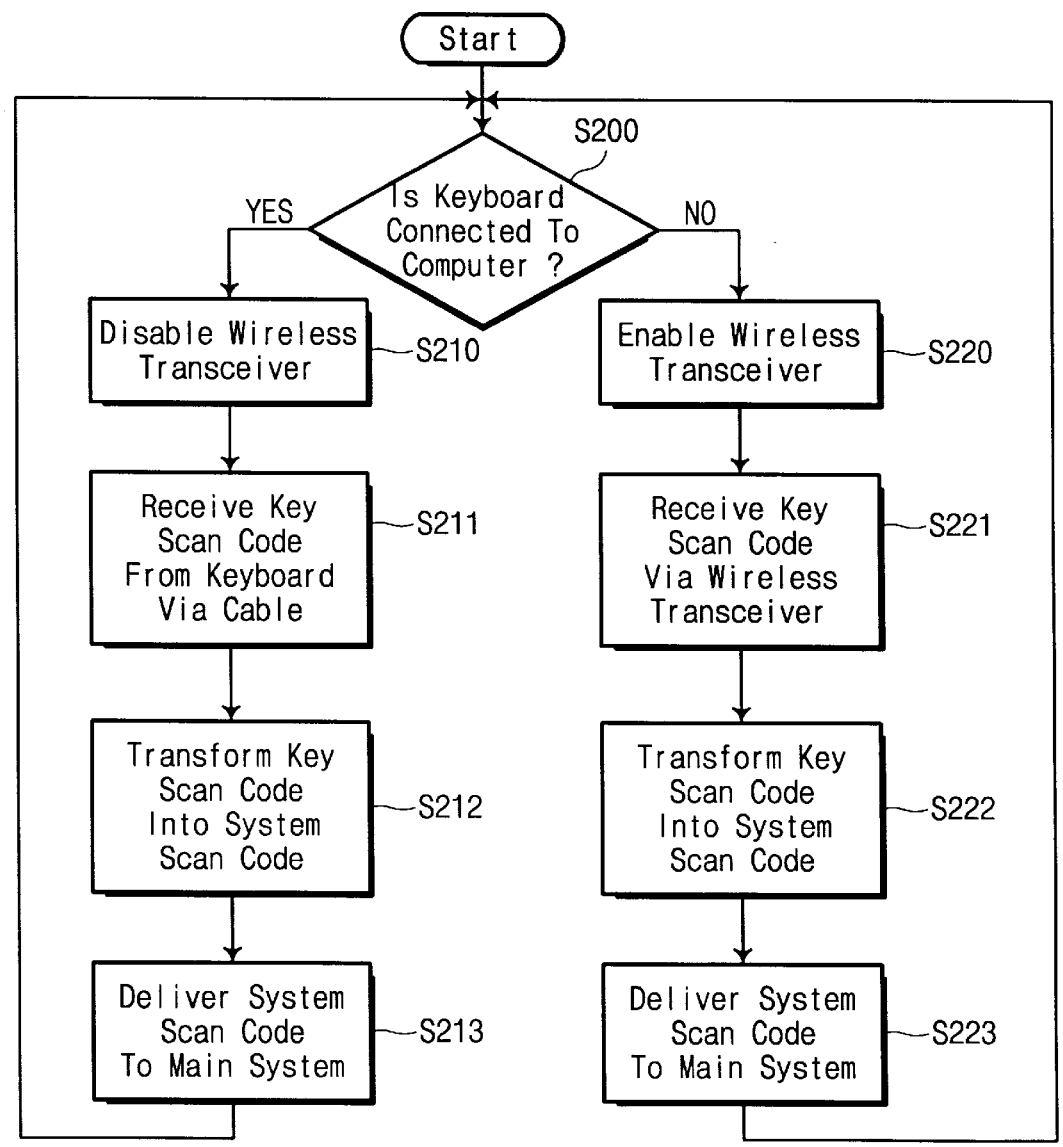
FIG. 8 is a flow chart of an operation of the computer system as shown in FIG. 3.

Referring to FIG. 8, the operation of the computer main unit 10 is now described. At step S200, the controller 12 of the computer main unit 10 determines whether or not the keyboard 30 is connected to the computer main unit 10 through the connector cable 40a. This determination step can be accomplished by checking the keyboard communication port 11.

At step S200, if the keyboard 30 is connected to the computer main unit 10 through the connector cable 40a, the controller 12 of the computer main unit 10 proceeds to step S210 wherein the wireless transceiver 13 is disabled. At step S211, the computer main unit 10 receives the key scan code via the connector cable 40a from the keyboard 30, and proceeds to step S212. At step S212, the key scan code received is transformed into a system scan code, and the controller 12 proceeds to step S213 wherein the system scan code is delivered to the main system 14.

At step S200, if the keyboard 30 is not connected to the computer main unit 10 through the connector cable 40a, the controller 12 of the computer main unit 10 proceeds to step S220. At step S220, the operation of the wireless transceiver 12 is enabled and the controller 13 proceeds to step S221, wherein the computer main unit 10 receives the wireless signal corresponding to the key scan code through the wireless transceiver 13. At step S222, the key scan code received is transformed into a corresponding system scan code, and the controller 12 proceeds to step S223. At step S223, the system scan code is delivered to the main system 14.

As described above, when the keyboard 30 operates with wire communication, the rechargeable battery 34 located therein is charged by the charging circuit 35 using a power voltage supplied from the computer main unit 10. Also, when the keyboard 30 operates with wireless communication, the rechargeable battery 34 provides the battery voltage that is charged during wire communication for operation.

Embodiment 2

Figure 9:
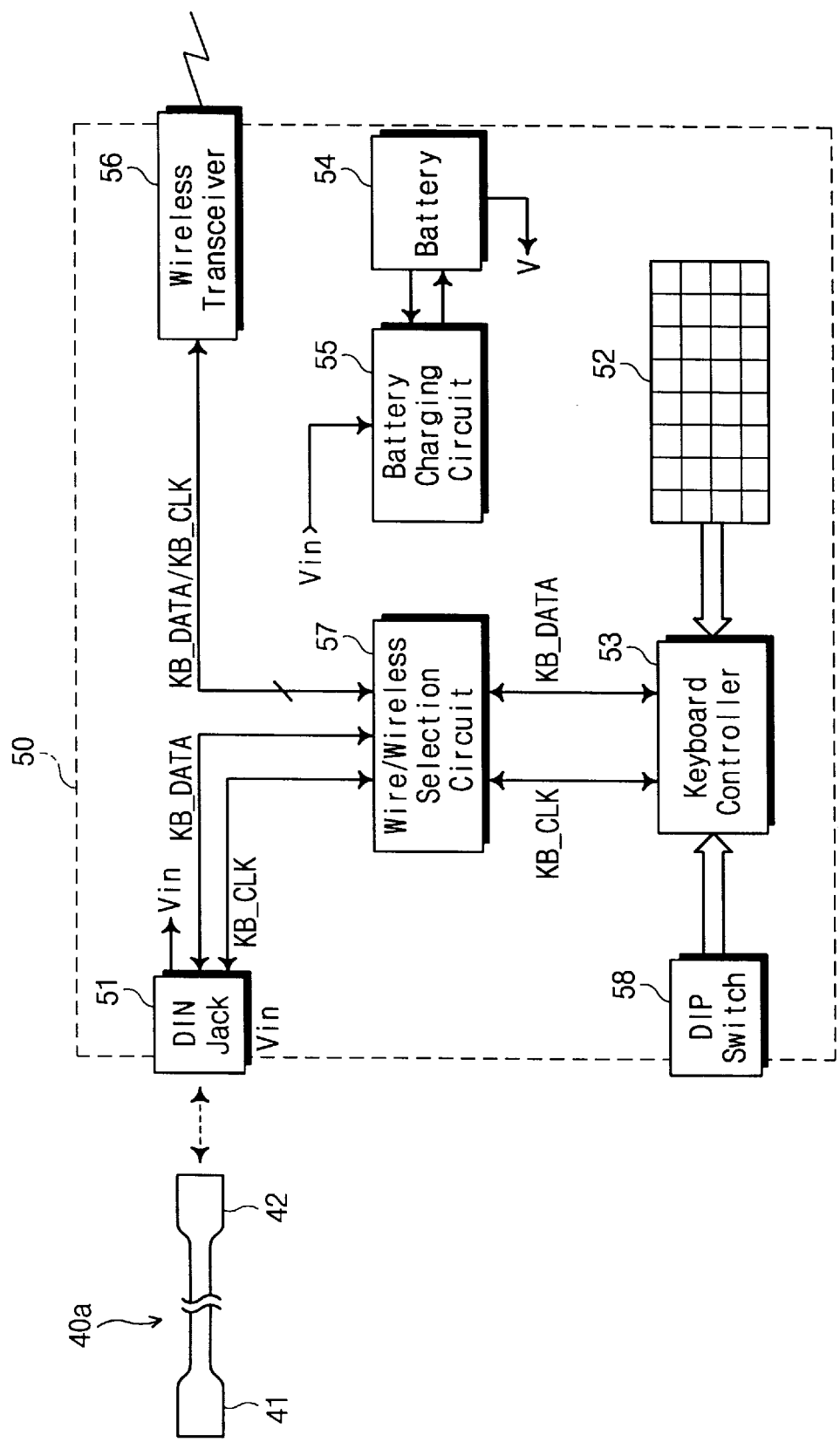
FIG. 9 is a circuit diagram showing a wire/wireless keyboard according to another example of the present invention.

FIG. 9 is a circuit diagram of a wire/wireless keyboard 50 according to a second embodiment of the present invention. Similarly to the first embodiment, the keyboard 50 can operate in both wire and wireless communication modes. The keyboard 50 is further equipped with a user ID (identification) setting function. Herein, the user ID setting function is provided to prevent noise generation when the keyboard 50 operates in a wireless communication mode. The noise generation can be prevented by generating a specific wireless signal corresponding to a user ID.

Referring back to FIG. 9, the keyboard 50 with a user ID setting function has a DIN jack 51 connected with the connector cable 40a, a key matrix 52, a keyboard controller 53 for controlling overall operations of the keyboard 50, a battery charging circuit 55 for charging a rechargeable battery 54, a wireless transceiver 56 for wireless communication, a wire/wireless communication selection circuit 57, and an ID setting switch 58, and an indicator (not shown) which indicates the operation state of the keyboard 50.

In order for the keyboard 50 to operate in a wire communication mode, the connector cable 40a is connected between the keyboard 50 and the computer main unit 10 in the same way as the first embodiment shown in FIG. 3. In this case, the wire/wireless selection circuit 57 allows the input/output of keyboard data (e.g., key scan code) and clock signals KB_DATA and KB_CLK between the controller 53 and the DIN jack 51. The rechargeable battery 54 is charged by the battery charging circuit 55 using a power voltage Vin supplied from the computer main unit 10, when the keyboard 50 is connected to the computer main unit 10 via the DIN jack 51.

If the keyboard 50 operates in a wireless communication mode, the connector cable 40a is separated from the computer main unit 10 and the keyboard 50. In this case, the keyboard 50 can operate with the battery voltage charged in the rechargeable battery 54, and the wire/wireless selection circuit 57 allows the input/output of the signals KB_DATA and KB_CLK between the controller 53 and the wireless transceiver 56. This transceiver 56 is provided to convert an input signal into a wireless signal and transmit it to the computer main unit 10.

In the case the wire/wireless selection circuit 57 is composed of a multiplexer, the power voltage Vin supplied via the DIN jack 51 may be used as a selection signal for the multiplexer. So, the keyboard controller 53 can determine the wire/wireless communication of the keyboard 50 by detecting whether or not the power voltage Vin is supplied via the DIN jack 51.

The user ID setting switch 58 is composed of a DIP (dual in package) switch. The ID information may be set by adjusting the DIP switch. If the keyboard 50 operates with wireless communication, the keyboard controller 53 determines a setting state of the user ID setting switch to generate a user ID information. This user ID information is provided to the wireless transceiver 56, together with the keyboard data signal KB_DATA.

Although not shown, an ID setting switch may be located in the computer main unit 10, and consequently, the user ID information can be set by the computer main unit 10. The computer main unit 10 receives the keyboard data signal KB_DATA including the user ID information and compares the user ID information with a preset user ID information. If the two user ID information are identical with each other, a key input operation through the keyboard 50 can be performed.

During the wireless communication the keyboard controller 53 allows the delivery of a user ID information, to which a keyboard data signal KB_DATA is added, to the computer main unit 10. In this situation, RF signals may be used for wireless communication. RF signals may be changed and transmitted in accordance with the setting state of the user ID information.

Figure 10:
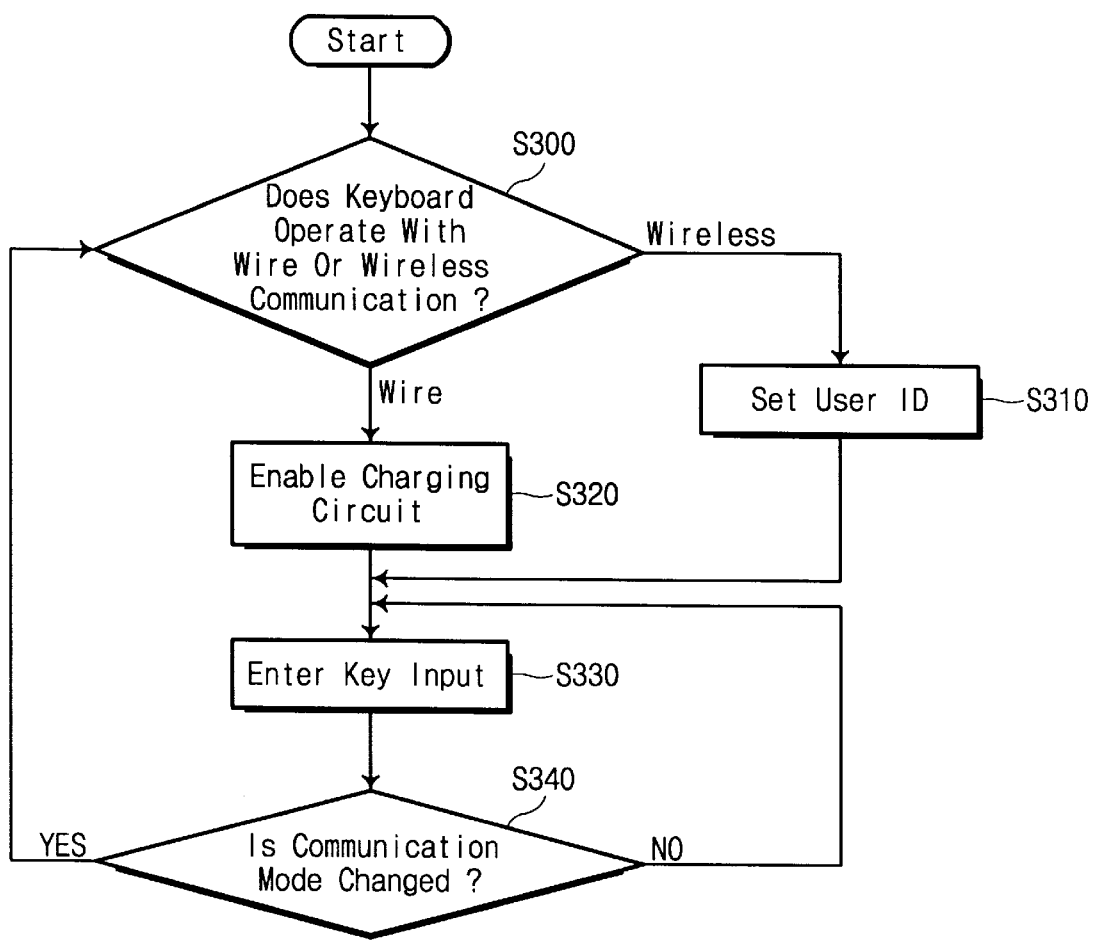
FIG. 10 is a flow chart showing an operation of the wire/wireless keyboard shown in FIG. 9.

FIG. 10 is a flow chart of an operation of the wire/wireless keyboard 50 as shown in FIG. 9. The control operation of keyboard 50 is accomplished by the keyboard controller 53. Referring to FIG. 10, at step S300, the keyboard controller 53 of the keyboard 50 determines whether the keyboard 50 operates in either wire or wireless communication mode. If the keyboard 50 operates with wireless communication, the controller 53 proceeds to step S310 wherein a user ID information is set. If the keyboard 50 operates with wire communication, the controller 53 proceeds to step S320 wherein the battery charging circuit 55 is enabled to charge the rechargeable battery 54.

At step S330, a key input operation is performed. If the keyboard 50 operates with wire communication, the keyboard data and clock signals KB_DATA and KB_CLK are provided to the DIN jack 41, and if the keyboard 50 operates with wireless communication, the signals are provided to the wireless transceiver 56. The controller 53 proceeds to step S340 to determine whether or not a communication mode is changed, e.g., a change of the wire communication to the wireless communication, or reversely. At step S340, if the communication mode is changed, the controller 53 proceeds to step S300, and if not, the controller 53 proceeds to step S330.

As described above, according to the present invention, when a wire/wireless keyboard operates with wire communication, a power voltage is supplied from a computer main unit and a rechargeable battery is charged with the power voltage. If the wire/wireless keyboard of the invention operates with wireless communication, noise generation can be prevented by a user ID setting function.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. In a computer system, comprising:

a keyboard adapted for data transmission in either a wire communications mode or else in a wireless communications mode;

a computer main unit comprising a main system and a power supply source, said system adapted for receiving data information from the keyboard via a one of said wire communications mode and said wireless communications mode; and a connector cable for connecting the keyboard to the computer main unit, when the keyboard and the computer main unit operate in said wire communications mode;

said keyboard comprising a rechargeable battery and a wireless transceiver for transforming data information into wireless signals for wireless transmission to the computer main unit during said wireless communication mode;

the improvement comprising: a controller adapted for controlling data information transmission from the keyboard, said data information to be transmitted by the wireless transceiver to the computer main unit during wireless communications mode and to be transmitted through the connector cable during wire communications mode; and adapted for causing said rechargeable battery to be charged with a power voltage supplied from the power supply source of the computer main unit via the connector cable during wire communications mode.

2. The computer system of claim 1, further comprised of said connector cable comprising a cable plug at both ends, and said keyboard comprising a jack connected to the cable plug for wire communications.

3. The computer system of claim 1, further comprised of said keyboard comprising means for detecting whether the connector cable is connected to the computer main unit, and switching operation of the keyboard from wireless communications to wire communications when the connector cable is connected to the computer main unit.

4. The computer system of claim 1, further comprised of said keyboard comprising an identification setting means for preventing noise generation with wireless communications.

5. The computer system of claim 4, further comprised of said controller adding identification data corresponding to an identification setting state of the identification setting means to the data information and generating identification data added information to the wireless transceiver for wireless transmission to the computer main unit, when the keyboard operates with the wireless communications.

6. The computer system of claim 1, further comprised of said computer main unit comprising a wireless transceiver for receiving data information transmitted from the keyboard during wireless communications.

7. The computer system of claim 1, said computer main unit comprises user identification information stored within, said keyboard transmits, before use, a keyboard data wireless signal comprising identification information from said keyboard to said computer main unit, said computer main unit compares said identification information of said keyboard data wireless signal with said user identification information and if said identification information of said keyboard data wireless signal matches with said user identification information stored within said computer main body, said computer main unit allows wireless communication between said keyboard and said computer main unit, and if said identification information of said keyboard data wireless signal does not match with said user identification information stored within said computer main body, said computer main body disallows wireless communication between said keyboard and said computer main unit.

8. In a wire/wireless keyboard for use in a computer system having a computer main unit, said keyboard comprising:

a wireless transceiver for transforming data information into wireless signals and for transmitting the wireless signals to the computer main unit;

a socket for receiving a connector cable adapted to be connected between the keyboard and the computer main unit; and a rechargeable battery and a rechargeable circuit for charging the rechargeable battery with a power voltage supplied from the power supply source of the computer main unit during wire communications;

the improvement comprising: a controller adapted for controlling data information transmission from the keyboard, said data information to be transmitted by the wireless transceiver to the computer main unit during a wireless communications mode and to be transmitted through the connector cable to the computer main unit during a wire communications mode; and adapted for causing said rechargeable battery to be charged with a power voltage supplied from the power supply source of the computer main unit via the connector cable during wire communications mode.

9. The keyboard of claim 8 further comprising a DIP switch in said keyboard to provide user identification for preventing noise generation during wireless keyboard communication.

10. The keyboard of claim 8 further comprising a DIP switch in said computer main unit to provide user identification for preventing noise generation during wireless keyboard communication.

11. The keyboard of claim 9 further comprising a DIP switch in said computer main unit to provide user identification for preventing noise generation during wireless keyboard communication, wherein the DIP switch settings in said computer main body must be identical to the DIP switch settings in said keyboard in order for said wireless keyboard to function.

12. The computer system of claim 8, said computer main unit comprises user identification information stored within, said keyboard transmits, before use, a keyboard data wireless signal comprising identification information from said keyboard to said computer main unit, said computer main unit compares said identification information of said keyboard data wireless signal with said user identification information and if said identification information of said keyboard data wireless signal matches with said user identification information stored within said computer main body, said computer main unit allows wireless communication between said keyboard and said computer main unit, and if said identification information of said keyboard data wireless signal does not match with said user identification information stored within said computer main body, said computer main body disallows wireless communication between said keyboard and said computer main unit.

13. A method of improving power usage when operating a computer system having a wire/wireless keyboard, said method comprising the steps of:

(1) determining whether the keyboard is connected to a computer main unit of the computer system via a connector cable for data transmission;

(2) when the keyboard is connected to the computer main unit via said connector cable: (a) transmitting key input data from the keyboard to the computer main unit via said connector cable for operation and (b) charging a rechargeable battery located in the keyboard via the connector cable, with a power supplied from the computer main unit; and (3) when the keyboard is not connected to the computer main unit via said connector cable, transmitting wireless signals corresponding to said key input data from the keyboard to the computer main unit for operation.

14. The method of claim 13, further comprised of said wireless signals including user identification data specific to the computer main unit to avoid noise interference from other wireless devices in the proximity of the computer system.

15. The method of claim 14, further comprising the steps of:

receiving a keyboard data wireless signal by said computer main unit from said keyboard, said keyboard data wireless signal comprising identification information from the keyboard;

comparing said received keyboard data wireless signal with a preset user identification information stored in said computer main unit;

enabling wireless operation between said keyboard and said computer main unit when said identification information from said keyboard data wireless signal agrees and matches said preset user identification information stored in said computer main unit; and disabling wireless operation between said keyboard and said computer main unit when said identification information from said keyboard data wireless signal disagrees and does not match said preset user identification information stored in said computer main unit.

16. The method of claim 13, further comprising the steps of:

receiving a keyboard data wireless signal by said computer main unit from said keyboard, said keyboard data wireless signal comprising identification information from the keyboard;

comparing said received keyboard data wireless signal with a preset user identification information stored in said computer main unit;

enabling wireless operation between said keyboard and said computer main unit when said identification information from said keyboard data wireless signal agrees and matches said preset user identification information stored in said computer main unit; and disabling wireless operation between said keyboard and said computer main unit when said identification information from said keyboard data wireless signal disagrees and does not match said preset user identification information stored in said computer main unit.

* * * * *